United States Patent
Guo (10) Patent No.: US 9,880,706 B2
(45) Date of Patent: Jan. 30, 2018

(54) GESTURE FOR SELECTING MULTIPLE ITEMS IN A LIST

(71) Applicants: Beijing Lenovo Software Ltd., Beijing (CN); Lenovo (Beijing) Co., Ltd., Beijing (CN)

(72) Inventor: Cheng Guo, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 210 days.

(21) Appl. No.: 14/497,982

(22) Filed: Sep. 26, 2014

(65) Prior Publication Data

US 2015/0253976 A1    Sep. 10, 2015

(30) Foreign Application Priority Data

Mar. 7, 2014  (CN) .......................... 2014 1 0083775

(51) Int. Cl.
  *G06F 3/0482* (2013.01)
  *G06F 3/0484* (2013.01)
  *G06F 3/0488* (2013.01)

(52) U.S. Cl.
  CPC .......... *G06F 3/0482* (2013.01); *G06F 3/0488* (2013.01); *G06F 3/04842* (2013.01); *G06F 3/04847* (2013.01); *G06F 3/04883* (2013.01)

(58) Field of Classification Search
  CPC ............... G06F 3/04847; G06F 3/0482; G06F 3/04842; G06F 3/0488; G06F 3/04883
  See application file for complete search history.

(56) References Cited

U.S. PATENT DOCUMENTS 5,196,838 A * 3/1993 Meier ................. G06F 3/04812
                                                345/684
2002/0141643 A1* 10/2002 Jaeger .................. G06F 3/0481
                                                382/181

(Continued)

FOREIGN PATENT DOCUMENTS

CN           103064626 A       4/2013
WO       WO-2012097759 A2      7/2012

OTHER PUBLICATIONS

First Chinese Office Action regarding Application No. 201410083775.X dated Jun. 2, 2016. English translation provided by Unitalen Attorneys at Law.

(Continued)

*Primary Examiner* — Justin R Blaufeld
(74) *Attorney, Agent, or Firm* — Harness, Dickey & Pierce, P.L.C.

(57) ABSTRACT

An information processing method and an electronic device, related to the field of communication, are provided in the application. The method includes: displaying M data entries of a page on a display interface by a display unit, where the page includes N data entries, M≤N; obtaining a continuous track generated by a slide operation by an operating body; determining L data entries from J data entries passed by the continuous track based on a predetermined rule, 1≤J≤N, L≤J; and setting the L data entries into selected states. By the solutions in the application, an operation of selecting multiple data entries is implemented without clicking check boxes one by one by a user, the operation is significantly simplified, and efficiency of a multiple selection is improved.

7 Claims, 5 Drawing Sheets

(56) References Cited

U.S. PATENT DOCUMENTS

| | | | |
|---|---|---|---|
| 2005/0154991 A1* | 7/2005 | Jaeger | G06F 3/0481 715/769 |
| 2009/0282332 A1 | 11/2009 | Porat | |
| 2011/0202835 A1* | 8/2011 | Jakobsson | G06F 3/0481 715/702 |
| 2012/0216150 A1* | 8/2012 | Wernecke | G06F 3/04886 715/850 |
| 2013/0227480 A1 | 8/2013 | Kim et al. | |
| 2014/0237399 A1* | 8/2014 | Ren | G06F 3/04883 715/764 |
| 2015/0026641 A1* | 1/2015 | Wu | G06F 3/0488 715/823 |
| 2015/0143291 A1* | 5/2015 | Zha | G06F 3/04883 715/810 |
| 2015/0355782 A1 | 12/2015 | Zhang et al. | |

OTHER PUBLICATIONS

First German Office Action regarding Application No. 102014114112.1 dated Feb. 23, 2017. English translation provided by Unitalen Attorneys at Law.

* cited by examiner

GESTURE FOR SELECTING MULTIPLE ITEMS IN A LIST

CROSS-REFERENCES TO RELATED APPLICATIONS

This application claims priority to Chinese Patent Application No. 201410083775.X, entitled "INFORMATION PROCESSING METHOD AND ELECTRONIC DEVICE", filed with the Chinese State Intellectual Property Office on Mar. 7, 2014, which is incorporated herein by reference in its entirety.

BACKGROUND OF THE INVENTION

Field of the Invention

The present application relates to the field of communication, particularly to an information processing method and an electronic device.

Description of the Related Art

A check box is a basic control, usually used to open or close an option. This control is set in most applications. The check box has two states: one is a selected state, and the other is a cleared state. The selected state indicates that the option is checked by a user, and the cleared state indicates that the option is unselected by a user.

At present, when a user selects multiple options in a list, a common way is to click check boxes, i.e., a function of checking multiple options is accomplished by clicking multiple check boxes. However, by this way, the user needs to click the check boxes one by one. Thus the operation is inconvenient. Especially when there are a large number of options to be checked, the operation is cumbersome and inefficient.

SUMMARY

In one aspect, an information processing method is provided. The method includes:
  displaying M data entries of a page on a display interface by the display unit, where the page includes N data entries, M≤N;
  obtaining a continuous track generated by a slide operation by an operating body;
  determining L data entries from J data entries passed by the continuous track based on a predetermined rule, 1≤J≤N, L≤J; and
  setting the L data entries into selected states.

In another aspect, an electronic device is provided. the device includes:
  a display unit, configured to display M data entries of a page on a display interface, where the page includes N data entries, M≤N;
  an obtaining unit, configured to obtain a continuous track generated by a slide operation by an operating body;
  a determination unit, configured to determine L data entries from J data entries passed by the continuous track based on a predetermined rule, 1≤J≤N, L≤J; and
  a setting unit, configured to set the L data entries into selected states.

BRIEF DESCRIPTION OF THE DRAWINGS

To better explain the technical solutions in embodiments of the application, drawings for description of the embodiments are described below briefly. Apparently, the drawings described below are merely a few embodiments of the application. For those skilled in the art, other drawings may be obtained according to these drawings without paying any creative work.

DETAILED DESCRIPTION OF THE EMBODIMENTS

For clarity of the purpose, technical solutions and advantages of the application, embodiments of the application are further described in detail in combination with drawings.

First Embodiment

Figure 1:
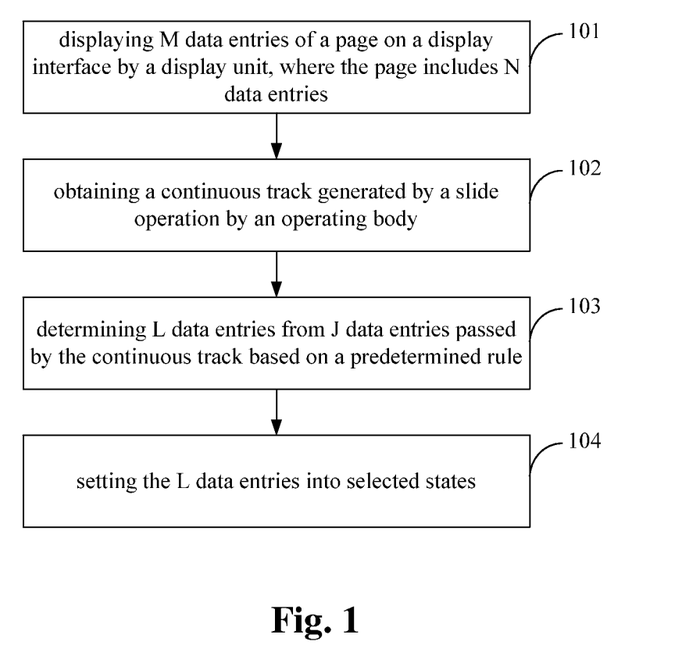
FIG. 1 is a flow chart of an information processing method provided in a first embodiment of the application.

Referring to FIG. 1, an information processing method applicable to an electronic device is provided in this embodiment, where the electronic device includes a display unit. The method includes steps 101-104.

Step 101 includes displaying M data entries of a page on a display interface by the display unit, where the page includes N data entries, M≤N, and both M and N are positive integers.

The data entries are options which are displayed on a display interface by the display unit, can be selected and viewed by a user, and are usually displayed in a form of a list, contents and forms of the data entries are not specifically limited in the embodiment. For example, the data entries may be mails in a mailing list, or short messages in a short message list, etc. The list of data entries may be laterally aligned or longitudinally aligned, etc., to be displayed.

In general, there are many data entries included in a page, therefore for a display interface, especially a limited size display interface such as a display interface of a mobile phone, it may happen that data entries in the page can not be all shown in the display interface. In this case, usually a scrolling display is performed in response to operations of a user, so that all the data entries can be viewed by the user.

Step 102 includes obtaining a continuous track generated by a slide operation by an operating body.

Where the operating body may be a finger of the user, or a mouse, etc., which are not limited in the embodiment.

In the embodiment, the continuous track may be a straight track, or of course, may be a curved track, which are not limited in the embodiment.

Step 103 includes determining L data entries from J data entries passed by the continuous track based on a predetermined rule, where 1≤J≤N, L≤J.

Step 104 includes setting the L data entries into selected states.

In most cases L is greater than 1, alternatively, L may also be 1. In a case that L is greater than 1, a multiple selection of a plurality of data entries may be achieved. Thus a multiple selection of data entries may be achieved by a slide operation by the user. The operation is easy and convenient for the user.

In the embodiment, the determining L data entries from J data entries passed by the continuous track based on a predetermined rule, may include:

identifying the continuous track; in a case that the continuous track has no inflection point, determining data entries passed by the continuous track as the L data entries; and in a case that the continuous track has an inflection point, determining data entries passed by a remaining track from the continuous track without the inflection point as the L data entries.

In the embodiment, before the obtaining a continuous track generated by a slide operation by an operating body, the method may include that:

obtaining a trigger operation; and dividing the display interface into a first region and a second region in response to the trigger operation, and each data entry is displayed on the first region as well as on the second region.

Further, the determining L data entries from J data entries passed by the continuous track based on a predetermined rule, may include:

identifying the continuous track; and in a case that the continuous track at least partially locates in the first region, determining data entries passed by the continuous track locating in the first region as the L data entries.

In the embodiment, the identifying the continuous track, may further include:

when the end of the continuous track reaches a border of the display interface, and a period during which the end is keeping pressed on the display interface is longer than a predetermined length of time, the data entries passed by the continuous track further include new data entries newly displayed on the display interface based on a scrolling display operation during a first duration; where, the first duration is from the beginning of the scrolling display operation to the end of the slide operation or to the end of the scrolling display operation.

By displaying M data entries of a page on a display interface by a display unit, the page including N data entries, M≤N; obtaining a continuous track generated by a slide operation by an operating body; determining L data entries from J data entries passed by the continuous track based on a predetermined rule, 1≤J≤N, L≤J; and setting the L data entries into selected states, an operation of selecting multiple data entries is implemented without clicking check boxes one by one by a user, the operation is significantly simplified, and efficiency of a multiple selection is improved by the method provided in the embodiment.

Second Embodiment

Figure 2:
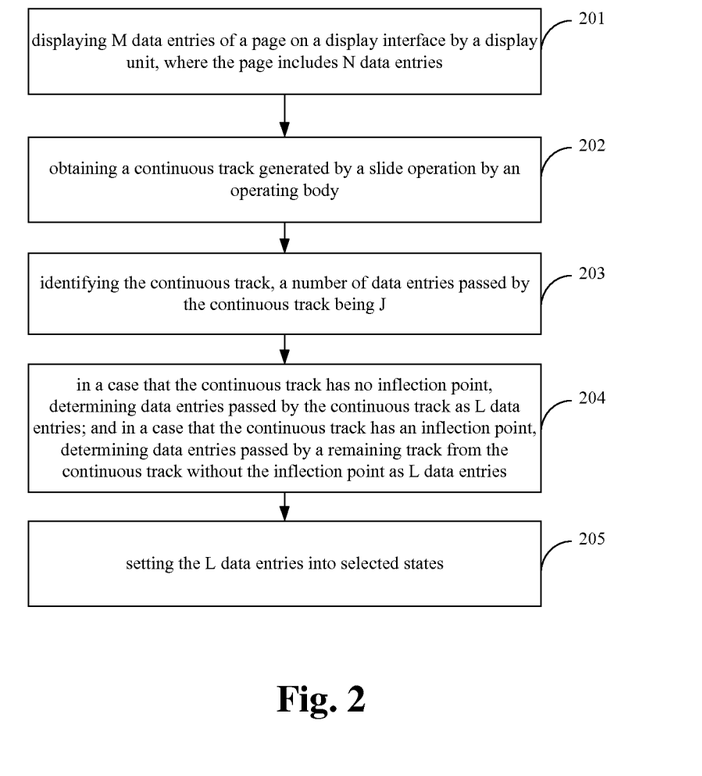
FIG. 2 is a flow chart of an information processing method provided in a second embodiment of the application.

Referring to FIG. 2, an information processing method applicable to an electronic device is provided in this embodiment, where the electronic device includes a display unit. The method includes steps 201-205.

Step 201 includes displaying M data entries of a page on a display interface by the display unit, where the page includes N data entries, M≤N, both M and N are positive integers.

Step 202 includes obtaining a continuous track generated by a slide operation by an operating body.

Step 203 includes identifying the continuous track, where the number of data entries passed by the continuous track is J, 1≤J≤N.

Step 204 includes, in a case that the continuous track has no inflection point, determining data entries passed by the continuous track as L data entries, and L=J; and in a case that the continuous track has an inflection point, determining data entries passed by a remaining track from the continuous track without the inflection point as L data entries, and L<J.

In the embodiment, when a user selects data entries, a scene may be that multiple continuous data entries are to be selected, or another scene may be that discontinuous data entries are to be selected. When selecting multiple continuous data entries, a straight slide operation may be performed. In this case, the continuous track generated by the slide operation is a straight track with no inflection point. When selecting multiple discontinuous data entries, a curved slide operation may be performed. In this case, the continuous track generated by the slide operation is a curved track with an inflection point.

Figure 3:
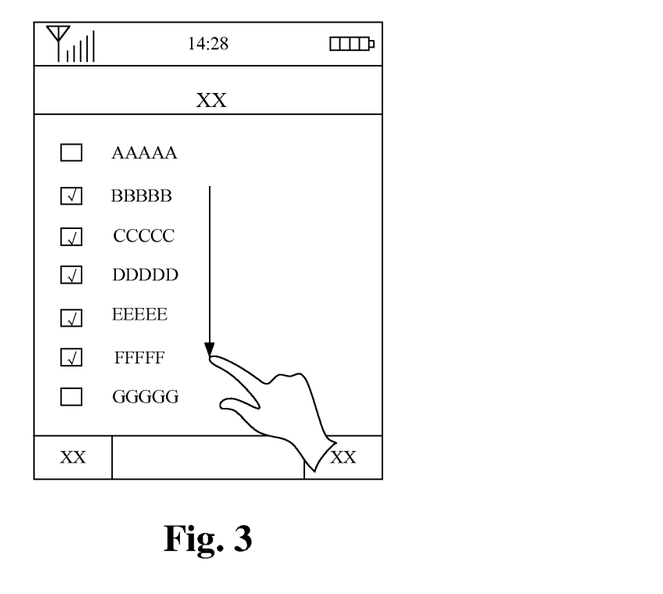
FIG. 3 is a diagram of a continuous track with no inflection point provided in the second embodiment of the application.
Figure 4:
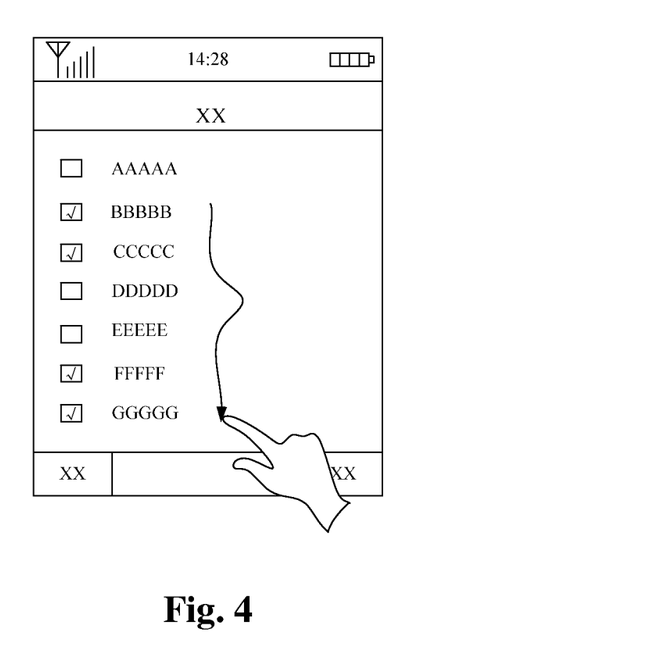
FIG. 4 is a diagram of a continuous track with a inflection point provided in the second embodiment of the application.

For example, there are 30 mails in a mailing list on a page, and 7 mails thereof are displayed on a display interface. Referring to FIG. 3, a slide operation by a user generates a straight track, and data entries passed are 5 data entries from "BBBBB" to "FFFFFF", therefore, the 5 data entries are set into selected states, and a multiple selection of continuous data entries is achieved. Referring to FIG. 4, a slide operation by a user generates a curved track with an inflection point, and data entries passed by a remaining track by removing the inflection point from the curved track are "BBBBB" and "CCCCC", and "FFFFFF" and "GGGGG", therefore, the 4 data entries are set into selected states, and a multiple selection of discontinuous data entries is achieved.

In the embodiment, a range of the slide operation by the user may be the whole display interface, and is not limited to left, right, or top, bottom, etc., of the display interface. The user may perform a slide operation at will, which is very convenient for the user.

Step 205 includes setting the L data entries into selected states.

Further, the identifying the continuous track may further include:

when the end of the continuous track reaches a border of the display interface, and a period during which the end is keeping pressed on the display interface is longer than a predetermined length of time, the data entries passed by the continuous track further include new data entries newly displayed on the display interface based on a scrolling display operation during a first duration; where, the first duration is from the beginning of the scrolling display to the end of the slide operation or to the end of the scrolling display operation.

Where, the end of the continuous track reaches a border of the display interface, indicates that the slide operation moves to a border of the display interface and can not continue sliding. If the finger of the user or the mouse is not released at this moment, i.e., the slide operation is still not finished, then new data entries may be displayed on the display interface by performing a scrolling display operation. In this case, the new data entries newly displayed based on the scrolling display operation are also regarded as data entries passed by the continuous track. The slide operation may be finished during the scrolling display operation, and then the first duration is from the beginning of the scrolling display operation to the end of the slide operation. Alternatively, the slide operation may also be finished after the end of the scrolling display operation, and then the first duration is from the beginning of the scrolling display operation to the end of the scrolling display operation. In either case, all the new data entries newly displayed on the display interface during the first duration are regarded as the data entries passed by the continuous track.

For example, data entries 1-10 are displayed on a display interface, a slide operation slides down to a border of the display interface, and the user does not release his/her finger and keeps pressing, then the display interface scrolls upwards to display remaining data entries, and the new data entries include data entries 11, 12, 13 . . . . If the user releases his/her finger just after data entry 15 is displayed as a new data entry, or data entry 15 is a last data entry of the list, then the data entries passed by the continuous track generated by the slide operation further include data entries 11-15.

In addition, the above method may be performed when the data entries displayed on the display interface are in an edit state. Where, the edit state may be set by default, or triggered manually by the user, which is not limited in the embodiment. For example, a button may be set on the interface. When the user clicks the button, the data entries are set into the edit state. In the edit state, the user performs a slide operation to implement a multiple selection. Alternatively, the data entries are set into the edit state by default when the data entries are displayed, then a multiple selection may be implemented directly by performing a slide operation, without triggering manually by the user. In this case, to ensure a normal response to scroll browsing, a slide operation in response to scroll browsing and a slide operation in response to a multiple selection may be distinguished from each other for compatibility for both. For example, a slide operation by a single finger may be set in response to a multiple selection, and a slide operation by double fingers may be set in response to scroll browsing, and so on, which is not specifically limited in the embodiment.

By displaying M data entries of a page on a display interface by a display unit, the page including N data entries, M≤N, both M and N being positive integers; obtaining a continuous track generated by a slide operation by an operating body; identifying the continuous track; in a case that the continuous track has no inflection point, determining data entries passed by the continuous track as L data entries; and in a case that the continuous track has an inflection point, determining data entries passed by a remaining track from the continuous track without the inflection point as L data entries; and setting the L data entries into selected states, an operation of selecting multiple data entries is implemented without clicking check boxes one by one by a user, the operation is greatly simplified, and efficiency of a multiple selection is improved by the method provided in the embodiment.

Third Embodiment

Figure 5:
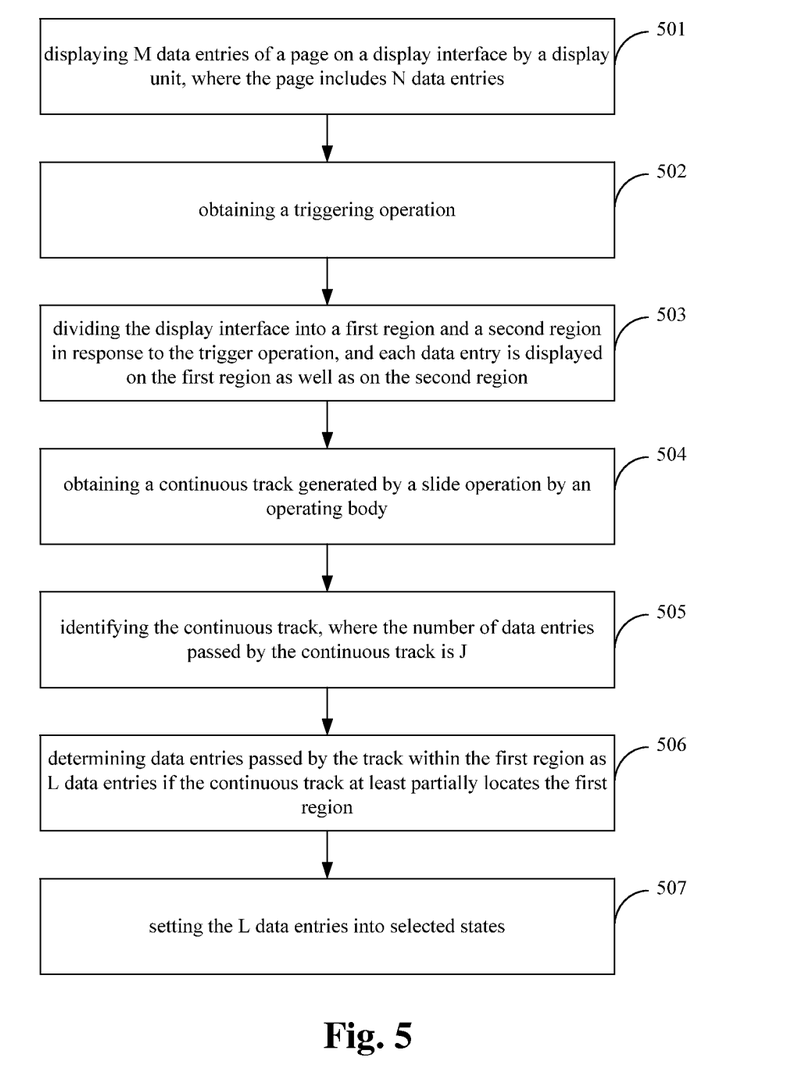
FIG. 5 is a flow chart of an information processing method provided in a third embodiment of the application.

Referring to FIG. 5, an information processing method applicable to an electronic device is provided in this embodiment, where the electronic device includes a display unit. The method includes steps 501-507.

Step 501 includes displaying M data entries of a page on a display interface by the display unit, where the page includes N data entries, M≤N, and both M and N are positive integers.

Step 502 includes obtaining a triggering operation.

Where, the triggering operation may have various forms, which are not limited in the embodiment.

Step 503 includes dividing the display interface into a first region and a second region in response to the trigger operation, and each data entry is displayed on the first region as well as on the second region.

A slide operation is responded with a multiple selection on the first region, a slide operation is responded with scrolling display on the second region. For the first region and the second region, any data entry is displayed both on the first region and on the second region, therefore, the first region contains all the data entries, and the second region also contains all the data entries. Thus, an operation of a multiple selection may be performed as required on any of the all data entries in the first region, and operations of viewing and browsing may be performed as required on any of the all data entries in the second region.

Figure 6:
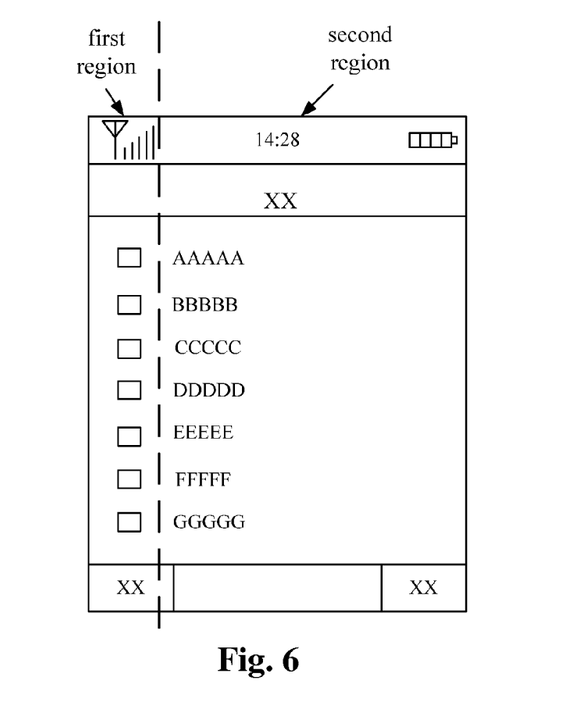
FIG. 6 is a diagram of a first region and a second region provided in the third embodiment of the application.

For example, referring to FIG. 6, with a dashed line on a display interface as a boundary, the display interface is divided into a first region on the left and a second region on the right. An operation of a multiple selection on any of the all data entries is performed in the first region, and an operation of viewing on any of the all data entries is performed in the second region, thus ensuring compatibility.

Step 504 includes obtaining a continuous track generated by a slide operation by an operating body.

Step 505 includes identifying the continuous track, where the number of data entries passed by the continuous track is J, and 1≤J≤N.

Step 506 includes determining data entries passed by the track within the first region as L data entries if the continuous track at least partially locates in the first region, L≤J.

In the embodiment, the continuous track may be a track with an inflection point, or a track with no inflection point. The rule here is to determine a track, which is a part falling in the first region of the continuous track, and to perform a multiple selection on the data entries passed by the track falling in the first region, without concerning a part falling in the second region of the continuous track.

Step 507 includes setting the L data entries into selected states.

Further, the above identifying the continuous track may further include:
when the end of the continuous track reaches a border of the display interface, and a period during which the end is keeping pressed on the display interface is longer than a predetermined length of time, data entries passed by the continuous track further include new data entries newly displayed on the display interface based on a scrolling display operation during a first duration;
where, the first duration is from the beginning of the scrolling display operation to the end of the slide operation or to the end of the scrolling display operation.

By displaying M data entries of a page on a display interface by a display unit, the page including N data entries, M≤N; obtaining a triggering operation, dividing the display interface into a first region and a second region in response to the trigger operation; obtaining a continuous track generated by a slide operation by an operating body, identifying the continuous track, determining data entries passed by the track within the first region as L data entries if the continuous track at least partially locates in the first region; and setting the L data entries into selected states, an operation of selecting multiple data entries is implemented without clicking check boxes one by one by a user, the operation is greatly simplified, and efficiency of a multiple selection is improved by the method provided in the embodiment.

Fourth Embodiment

Figure 7:
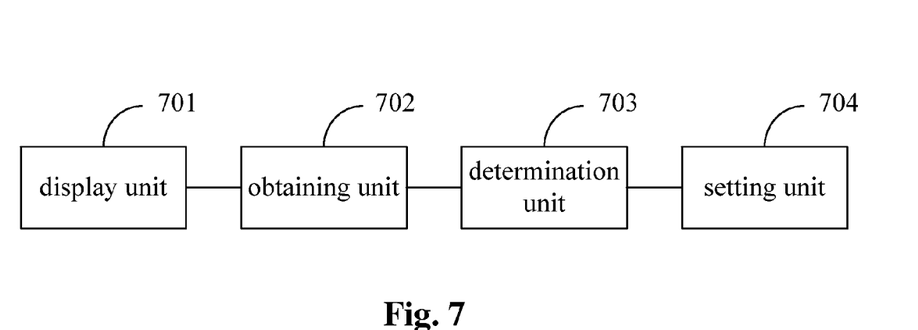
FIG. 7 is a structural diagram of an electronic device provided in a fourth embodiment of the application.

Referring to FIG. 7, an electronic device is provided in this embodiment, the electronic device includes:
- a display unit 701, configured to display M data entries of a page on a display interface, where the page includes N data entries, M≤N, and both M and N are positive integers;
- an obtaining unit 702, configured to obtain a continuous track generated by a slide operation by an operating body;
- a determination unit 703, configured to determine L data entries from J data entries passed by the continuous track based on a predetermined rule, where 1≤J≤N, L≤J; and
- a setting unit 704, configured to set the L data entries into selected states.

In the embodiment, the determination unit 703 may include:
- an identification sub-unit, configured to identify the continuous track; and
- a determination sub-unit, in a case that the continuous track has no inflection point, configured to determine data entries passed by the continuous track as the L data entries; and in a case that the continuous track has an inflection point, configured to determine data entries passed by a remaining track from the continuous track without the inflection point as the L data entries.

In the embodiment, the obtaining unit 702 may be further configured to: obtain a trigger operation; and
in correspondence, the electronic device may further include:
- a response unit, configured to divide the display interface into a first region and a second region in response to the trigger operation, where each data entry is displayed on the first region as well as on the second region.

Further, the determination unit 703 may include:
- an identification sub-unit, configured to identify the continuous track; and
- a determination sub-unit, in a case that the continuous track at least partially locates in the first region, configured to determine data entries passed by the continuous track located in the first region as the L data entries.

In the embodiment,
when the end of the continuous track reaches a border of the display interface, and a period during which the end is keeping pressed on the display interface is longer than a predetermined length of time, data entries passed by the continuous track further include new data entries newly displayed on the display interface based on a scrolling display operation during a first duration;
where, the first duration is from the beginning of the scrolling display operation to the end of the slide operation or to the end of the scrolling display operation.

The electronic device provided in the embodiment can perform any method provided in the foregoing method embodiments. The description in the method embodiments may be referred to for details which are not repeated here.

By displaying M data entries of a page on a display interface by a display unit, the page including N data entries, M≤N; obtaining a continuous track generated by a slide operation by an operating body; determining L data entries from J data entries passed by the continuous track according to a predetermined rule, 1≤J≤N, L≤J; and setting the L data entries into selected states. Thereby an operation of selecting multiple data entries is implemented without clicking check boxes one by one by a user, the operation is significantly simplified, and efficiency of a multiple selection is improved by the electronic device provided in the embodiment.

Those skilled in the art can understand that implementation of all or a few steps of the foregoing embodiments may be accomplished by hardware, or may be accomplished by program instructing related hardware. The program may be stored in a computer readable storage medium, where the storage medium may be a read-only memory, a magnetic disk or a CD.

The embodiments described above are merely preferable embodiments of the application, which are not to limit the application. All modifications, equivalent substitutions, or improvements made within the spirit and the principles of the application should be contained within the scope of the application.

What is claimed is:

1. An information processing method comprising:
    displaying M data entries of a page on a display interface by a display unit, wherein the page comprises N data entries, M≤N, the display interface comprising a first region, a second region, and a third region,
    wherein M check boxes are displayed in the first region, each check box corresponding to a respective data entry,
    wherein each of the M data entries is displayed in the second region, and
    wherein the third region is adjacent to the second region and does not display the M check boxes or the M data entries;
    obtaining a continuous track generated by a slide operation by an operating body,
    wherein the continuous track comprises:
        a first portion located in the third region that precedes and does not include an inflection point, and that passes beside J of the M data entries in the second region, 1≤j<M,
        a second portion located in the third region that includes the inflection point, and that passes beside K of the M data entries in the second region, 1≤K<M, and
        a remainder portion located in the third region that succeeds and does not include the inflection point, and that passes beside L of M data entries in the second region, 1≤L<M;
    wherein the continuous track does not intersect or encircle the J, K, or L data entries;
    identifying the continuous track;
    determining the J check boxes in the first region corresponding to the J data entries located beside the first portion of the continuous track;
    determining the K check boxes in the first region corresponding to the K data entries located beside the inflection point;
    determining the L check boxes in the first region corresponding to the L data entries passed by the remainder of the continuous track not including the inflection point;
    setting the J and L check boxes in the first region into selected states; and
    not setting the K check boxes in the first region into selected states.

2. The method according to claim 1 wherein, before obtaining the continuous track generated by a slide operation by an operating body, the method further comprises:
  obtaining a trigger operation; and
  dividing the display interface into the first, second, and third regions in response to the trigger operation.

3. The method according to claim 1, wherein identifying the continuous track further comprises:
  when the end of the continuous track reaches a border of the display interface, and a length of time during which the end is kept pressed on the display interface is longer than a predetermined length of time, data entries passed by the continuous track further comprise new data entries newly displayed on the display interface based on a scrolling display operation during a first duration;
  wherein the first duration is from a beginning of the scrolling display operation to an end of the slide operation or to an end of the scrolling display operation.

4. An electronic device, comprising:
  a display unit, configured to display M data entries of a page on a display interface, wherein the page includes N data entries, M≤N, the display interface comprising a first region, a second region, and a third region,
  wherein M check boxes are displayed in the first region, each check box corresponding to a respective data entry,
  wherein each of the M data entries is displayed in the second region, and
  wherein the third region is adjacent to the second region and does not display the M check boxes or the M data entries;
  an obtaining unit, configured to obtain a continuous track generated by a slide operation by an operating body,
  wherein the continuous track comprises:
    a first portion located in the third region that precedes and does not include an inflection point, and that passes beside J of the M data entries in the second region, 1≤J<M,
    a second portion located in the third region that includes the inflection point, and that passes beside K of the M data entries in the second region, 1≤K<M, and
    a remainder portion located in the third region that succeeds and does not include the inflection point, and that passes beside L of M data entries in the second region, 1≤L<M;
  wherein the continuous track does not intersect or encircle the J, K, or L data entries;
  a determination unit, configured to determine the L check boxes in the first region corresponding to the L data entries passed by the remainder portion of the continuous track not including the inflection point, to determine the J check boxes in the first region corresponding to the J data entries passed by the first portion of the continuous track, and to determine the K check boxes in the first region corresponding to the K data entries located beside the inflection point; and
  a setting unit, configured to set the J and L check boxes in the first region into selected states and to not set the K check boxes in the first region into selected states.

5. The electronic device according to claim 4, wherein the obtaining unit is further configured to:
  obtain a trigger operation; and the electronic device further comprises:
  a response unit, configured to divide the display interface into the first, second, and third regions in response to the trigger operation.

6. The electronic device according to claim 4, wherein:
  when the end of the continuous track reaches a border of the display interface, and a length of time during which the end is kept pressed on the display interface is longer than a predetermined length of time, data entries passed by the continuous track further comprise new data entries newly displayed on the display interface based on a scrolling display operation during a first duration;
  wherein the first duration is from a beginning of the scrolling display operation to an end of the slide operation or to an end of the scrolling display operation.

7. An information processing method comprising:
  displaying M check boxes in a first region of a display interface by a display unit;
  displaying M data entries in a second region of the display interface by the display unit, each one of the M data entries corresponding to a respective one of the M check boxes;
  displaying a third region adjacent to the second region of the display interface by the display unit, wherein neither the M check boxes nor the M data entries are displayed;
  in response to a slide operation by an operating body, obtaining a continuous track that passes by N of the M data entries in the second region,
  wherein the continuous track comprises:
    a first portion that precedes and does not include an inflection point and that is located in the third region beside a first one or more of the N data entries in the second region;
    a second portion that includes the inflection point and that is located in the third region beside a second one or more of the N data entries in the second region; and
    a third portion that succeeds and does not include the inflection point and that is located in the third regions beside a third one or more of the N data entries in the second region;
  determining the first one or more of the N data entries located beside the first portion of the continuous track that precede and do not include the inflection point;
  setting the first one or more of the check boxes corresponding to the first one or more N data entries in the first region to a selected state;
  determining the second one or more of the check boxes corresponding to the second one or more N data entries located beside the second portion of the continuous track that includes the inflection point;
  setting the second one or more of the check boxes corresponding to the second one or more N data entries in the first region to a not selected state;
  determining the third one of the check boxes corresponding to the third one or more N data entries located beside the third portion of the continuous track that succeed and do not include the inflection point; and
  setting the third one or more of the check boxes corresponding to the third one or more N data entries in the first region to a selected state.

* * * * *